US006539995B2

(12) United States Patent
Airoldi et al.

(10) Patent No.: US 6,539,995 B2
(45) Date of Patent: Apr. 1, 2003

(54) RELEASING DEVICE FOR SNOW CHAINS

(75) Inventors: Romolo Airoldi, Lecco (IT); Marco Arrigoni Neri, Ballabio (IT)

(73) Assignee: Konig SpA., Molteno (IT)

( * ) Notice: Subject to any disclaimer, the term of this patent is extended or adjusted under 35 U.S.C. 154(b) by 0 days.

(21) Appl. No.: 09/818,492

(22) Filed: Mar. 28, 2001

(65) Prior Publication Data

US 2002/0017350 A1 Feb. 14, 2002

(30) Foreign Application Priority Data

Aug. 7, 2000 (EP) .............................. 00830565

(51) Int. Cl.⁷ ............................................... B60C 27/06
(52) U.S. Cl. ..................... 152/217; 152/213 R; 152/231
(58) Field of Search ................. 152/170, 185, 152/213 R, 213 A, 217, 218, 219, 231

(56) References Cited

U.S. PATENT DOCUMENTS

| | | | | |
|---|---|---|---|---|
| 1,717,558 A | * | 6/1929 | Hanson | |
| 2,223,824 A | * | 12/1940 | Helwig | |
| 2,537,231 A | * | 1/1951 | Necrason | |
| 2,553,849 A | * | 5/1951 | Dines | |
| 2,717,623 A | * | 9/1955 | Maire et al. | |
| 2,792,867 A | * | 5/1957 | Basile | |
| 3,528,472 A | * | 9/1970 | Kubach | |
| 4,130,155 A | * | 12/1978 | Barnett et al. | |
| 4,282,916 A | * | 8/1981 | Carlson | |
| 4,334,568 A | * | 6/1982 | Thorpe | 152/218 |
| 4,368,769 A | * | 1/1983 | Rooksasin | 152/218 |
| 4,542,779 A | * | 9/1985 | Muller et al. | |
| 5,944,083 A | * | 8/1999 | Suzuki | |
| 6,009,922 A | * | 1/2000 | Gogan | 152/218 |
| 6,089,291 A | * | 7/2000 | Romolo et al. | |

FOREIGN PATENT DOCUMENTS

EP 0 993 970 4/2000

* cited by examiner

Primary Examiner—Russell D. Stormer
(74) Attorney, Agent, or Firm—Nixon & Vanderhye, P.C.; Frank P. Presta

(57) ABSTRACT

A releasing device for snow chains comprising an inner side portion (2) closable as a ring, suitable to be placed on an inner part of a tire (3), an outer side portion (4) suitable to be placed on an outer part of the tire (3), said portions being joined by variously composed elements (5) creating the tread traction, the releasing device comprising a closing device (8), for closure as a ring of the inner side portion (2) and an operating device (50), that can be operated by the user from the outside of the tire to open the closing device (8), the operating device (50) comprising protective members (53, 55) suitable to make it more stable and the closing device (8) being able to be opened manually even without the aid of the operating device.

9 Claims, 4 Drawing Sheets

RELEASING DEVICE FOR SNOW CHAINS

BACKGROUND OF THE INVENTION

The present invention relates to a releasing device for snow chains or anti-skid devices intended for mounting on the tires of vehicles.

When a vehicle travels on a road surface covered with snow, sleet or ice, its tires do not have a good grip and dangerous swerving or skidding of the vehicle can occur. To avoid these problems it is customary to use anti-skid devices, commonly called snow chains.

Snow chains, normally mounted on the driving wheels of the vehicle, bite into the snow and/or ice deposited on the road surface, increasing the tread traction and allowing the vehicle tires to achieve a good grip.

As is known, a snow chain generally consists of two side members (chains, flexible cables, steel wires, ropes or the like) which during use are closed in a ring on the inner face and the outer face of the wheel, respectively. These side members are connected by a series of chain portions variously disposed to achieve tread traction, the whole being completed by a tensioning device for said members, known as a tensioner.

Types of snow chains widely available on the market have an inner side portion consisting of an inner flexible ring that can be opened to allow widening thereof during the mounting operation, so that it can be applied to the inner face of the vehicle wheel. Said inner ring normally consists of a metal cable covered with a continuous or interrupted sheath.

Said known chains provide an inner fastening closure according to which one end of the cable of the inner ring is provided with a hollow elongated engaging means in which a portion thereof is able to receive a head provided at the other end of the cable, while another portion thereof is able to retain said head, a channel being provided which permits shifting of the cable along said engagement means, so that the head comes to be locked inside the locking portion.

This type of inner closure, though allowing easy locking of the ring portion, nevertheless presents some problems during removal.

The user, in order to remove the chains, is obliged to work from the inner side of the wheel. In fact he must find the closing device of the inner ring in the inner side of the wheel and manually carry out release of said device. This operation proves quite awkward, tiresome and complex. In fact the user must work in an uncomfortable position, is obliged to dirty his hands which inevitably come into contact with the tire and in addition has difficulty in finding the inner ring closing device which remains hidden on the inner side of the wheel. Consequently, said operation of removal of the chains proves excessively slow and tiresome.

Releasing devices are also known which provide operating means that can be operated from the outer side of the wheel to bring about release of the closing member of the inner ring. Said releasing devices have drawbacks due to the complexity of the closing member.

SUMMARY OF THE INVENTION

The object of the present invention is to eliminate the drawbacks of the prior art, providing a releasing device for snow chains that is safe, practical, easy to use, inexpensive and simple to make.

This object is achieved in accordance with the invention having the characteristics listed in appended independent claim 1.

Preferred embodiments of the invention will become apparent from the dependent claims.

The releasing device for snow chains according to the invention provides a closing device able to close the inner side portion of the chains as a ring and an operating device that acts on the closing device. The operating device can be operated from the outside of the tire by the user and provides a cable that acts on the closing device. Said cable is protected by means of two chains disposed alongside and parallel thereto and by means of crosspieces disposed transversally with respect to the cable and fixed to the links of the chain.

In this manner better stabilization and better functioning of the operating device are achieved.

Moreover the closing device has at one end of the cable of the inner ring a block containing a first tooth urged by elastic means to protrude externally on a seat so as to block a second tooth, fixed at the other end of the cable of the inner ring, and housed in the seat of the closing device. The cable of the operating device acts on a lever pivoted inside the closing device that makes the first tooth retract, so as to release the second tooth which can be extracted from the seat.

Such a device proves extremely simple and effective and allows perfect operation, reducing the risks of jamming.

Moreover, in the event of jamming of the operating device the possibility of releasing the snow chains is still ensured. In fact the shape of the second tooth and of the seat that receives it are such as to allow a rotation of the second tooth inside said seat so that the second tooth can be extracted from the seat even when the first tooth is not retracted inside the closing device.

BRIEF DESCRIPTION OF THE DRAWINGS

Further characteristics of the invention will be made clearer by the detailed description that follows, referring to a purely exemplary and therefore non-limiting embodiment thereof, illustrated in the appended drawings, in which.

DETAILED DESCRIPTION OF THE INVENTION

The releasing device for snow chains according to the invention is described with the aid of the figures.

Figure 1A:
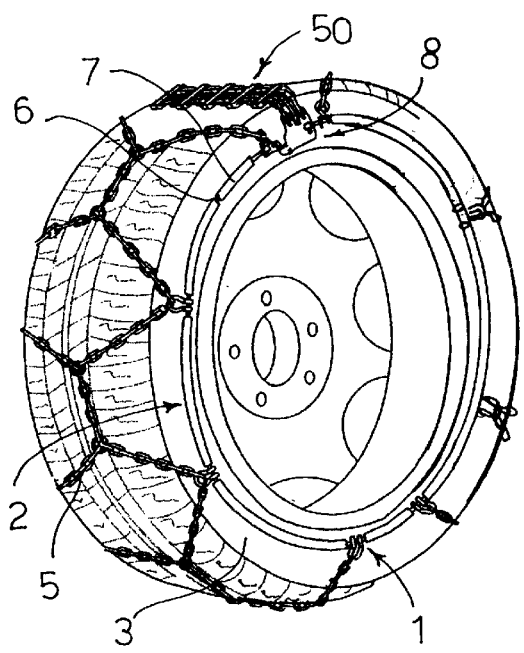
FIG. 1a is an axonometric view illustrating a wheel, taken from the inward facing side, on which is mounted a snow chain with the releasing device according to the invention.
Figure 1B:
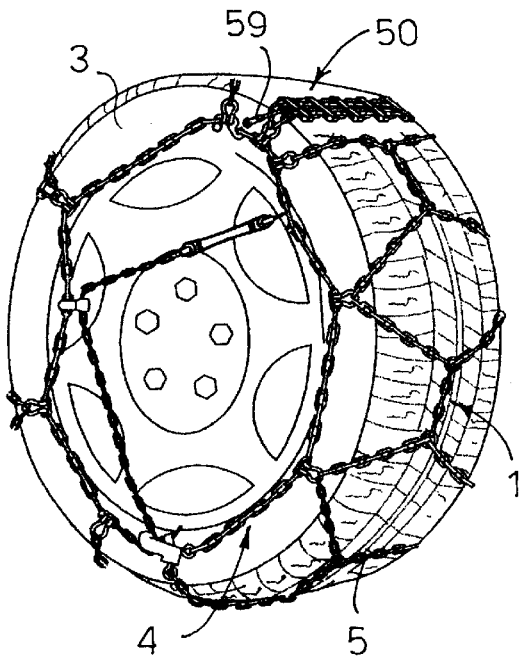
FIG. 1b is an axonometric view illustrating a wheel, taken from the outward facing side, on which is mounted a snow chain with the releasing device according to the invention.
Figure 4:
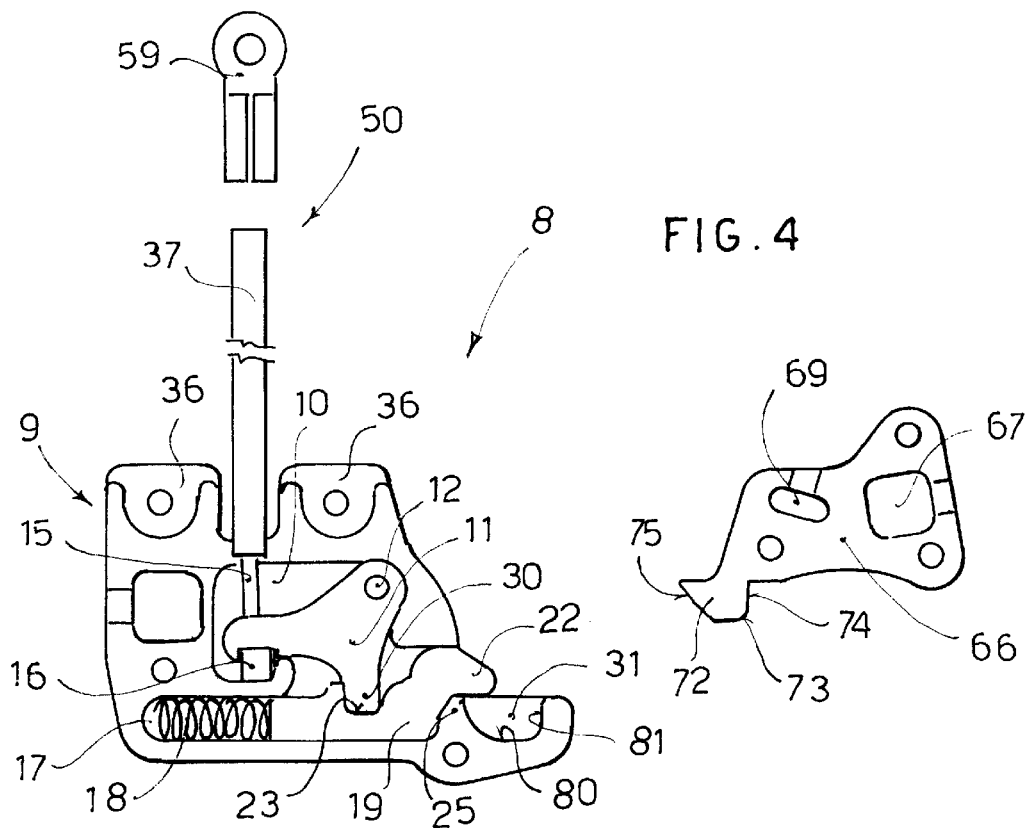
FIG. 4 is part-sectional a view of the releasing device as shown in FIG. 2.

With reference to FIG. 1, an anti-skid device, denoted as a whole by reference numeral 1, comprises an inner side portion 2, which is able to be disposed on the inner part of the tire 3 and an outer side portion 4. The outer side portion 4 of the anti-skid device 1 is made in a known manner by means of a closed ring of chain. These two inner and outer portions 2 and 4 are connected by various portions of anti-skid chain 5 variously disposed on the tread of the tire, in this case in a diamond shape.

The inner side portion 2 consists of an openable ring, made from a steel cable 6 coated with a suitable sheath 7, preferably not continuous. The cable 6 can be deformed to adapt to the curve of the wheel. The ring 2 is equipped at its two opening ends with a closing and locking device 8.

As shown in FIGS. 2–6, the locking device 8 comprises a body consisting of two substantially symmetrical half-shells 9 which can be joined together. The half-shell 9 (FIG. 6) has a substantially rectangular central seat 10 which houses a substantially triangular lever member 11, hinged by means of a pivot 12 in a hole 13 in the seat 10. A through hole 14 is provided at one end of the lever member 11 to receive a cable 15 forming part of an operating device 50 described below. The cable 15 is locked in the hole 14 by means of a cylindrical block 16 with a diameter larger than the diameter of the hole 14. The cable 15 extends from the half-shell 9 through an opening 35 in the seat 10. The cable 15 is covered by a sheath 37 disposed outside the shell 9. The lever 11, at the opposite end to that in which the hole 14 is situated, has a substantially rounded surface 30.

Beneath the rectangular seat 10 of the half-shell 9 a longitudinal seat 17 is provided which receives a helicoidal spring 18 and a pawl member 19. The spring 18 is located between the rear surface 20 of the seat 17 and the rear surface 21 of the pawl member 19. The pawl member 19 is is shaped as a substantially parallelepiped block, having at the front a tooth 22 beneath which is provided an abutment surface 24 that abuts against the forward end 25 of the longitudinal seat 17 of the half-shell 9. On the upper surface of the pawl member 19 a concave seat 23 is provided, apt to house the rounded end 30 of the lever member 11.

At the front end of the half-shell 9 is a seat 31 separated from the longitudinal seat 17 by the abutment surface 25 for the pawl member 19. In this manner the tooth 22 partially protrudes over the seat 31. The seat 31 has a substantially rounded lower surface 80 and a front abutment surface 81 substantially at right angles with respect to the lower surface 80.

The half-shell 9 further provides a square aperture 32 connected to an opening 33 toward the outside. The end of the cable 6 which must be fixed to the locking device 8 has a rectangular block 34 that engages inside aperture 32, whilst the cable 6 extends out from opening 33.

Figure 2:
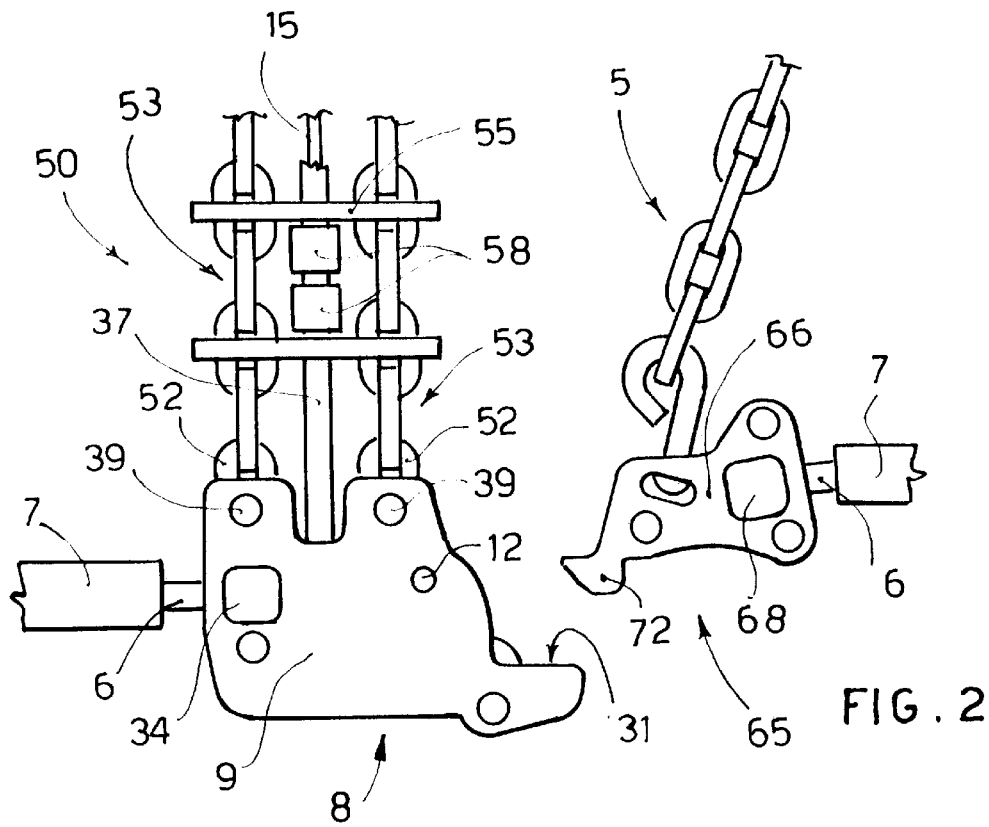
FIG. 2 is a front view, enlarged and inverted, of the releasing device in FIG. 1, shown it an open position.
Figure 3:
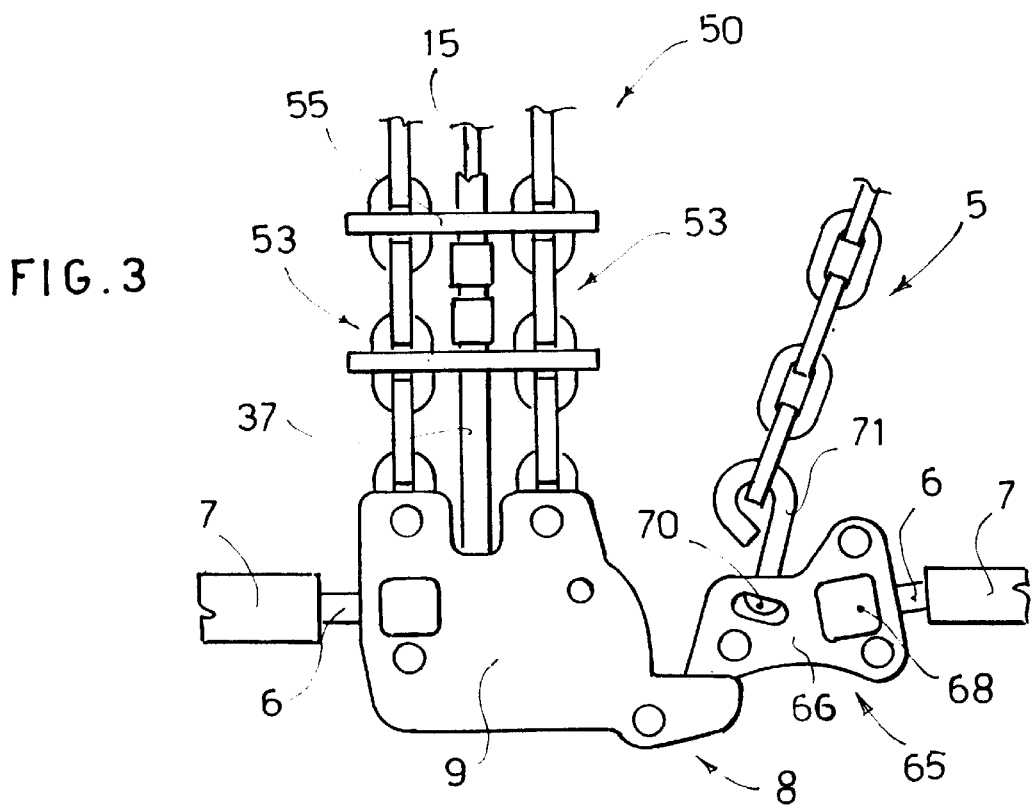
FIG. 3 a front view, enlarged and inverted, of the releasing device of FIG. 1, shown in a closed position.

In the upper part of the half-shell 9 two substantially semicircular seats (36) are made with a respective through hole 38 disposed in a central position. As shown in FIGS. 2 and 3, each seat 36 of the half-shell 9 receives a respective end link 52 of a chain portion 53 forming part of the operating device 50. The end links 52 are blocked in the respective seats 36 by means of pins 39 which engage in the holes 38.

Figure 8:
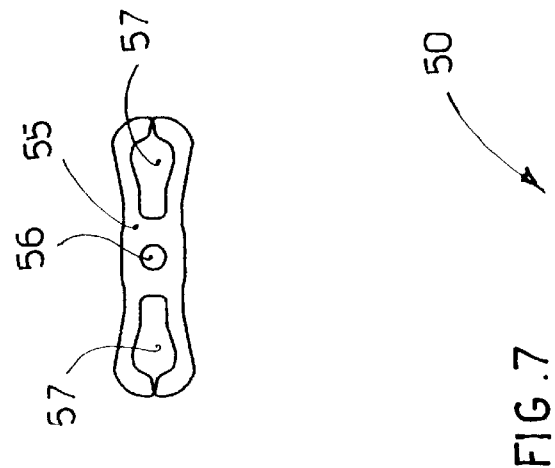
FIG. 8 is a front view of a cross piece of the operating device in FIG. 7.
Figure 7:
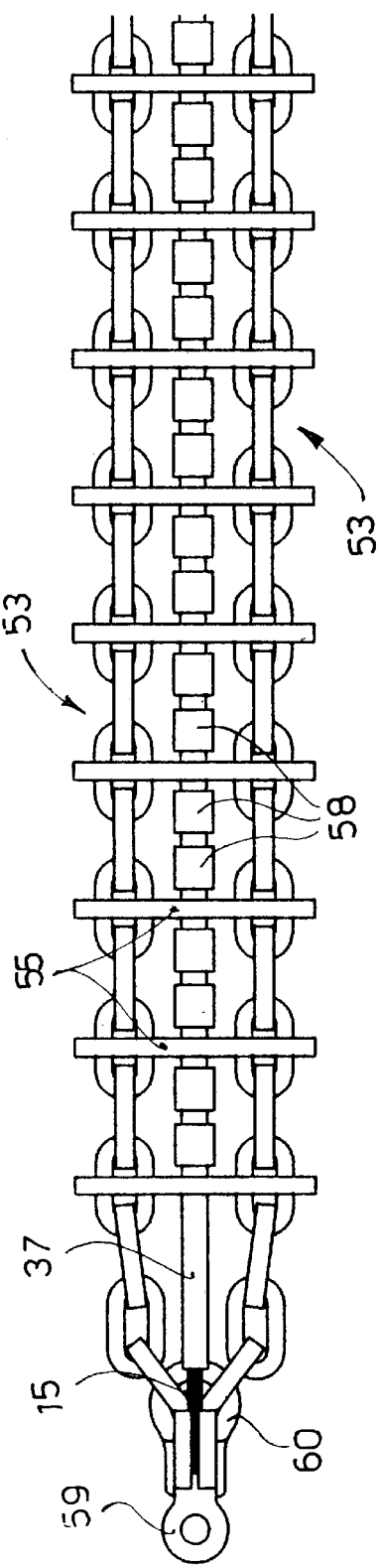
FIG. 7 is a plan view of the operating device of the releasing device according to the invention.
Figure 6:
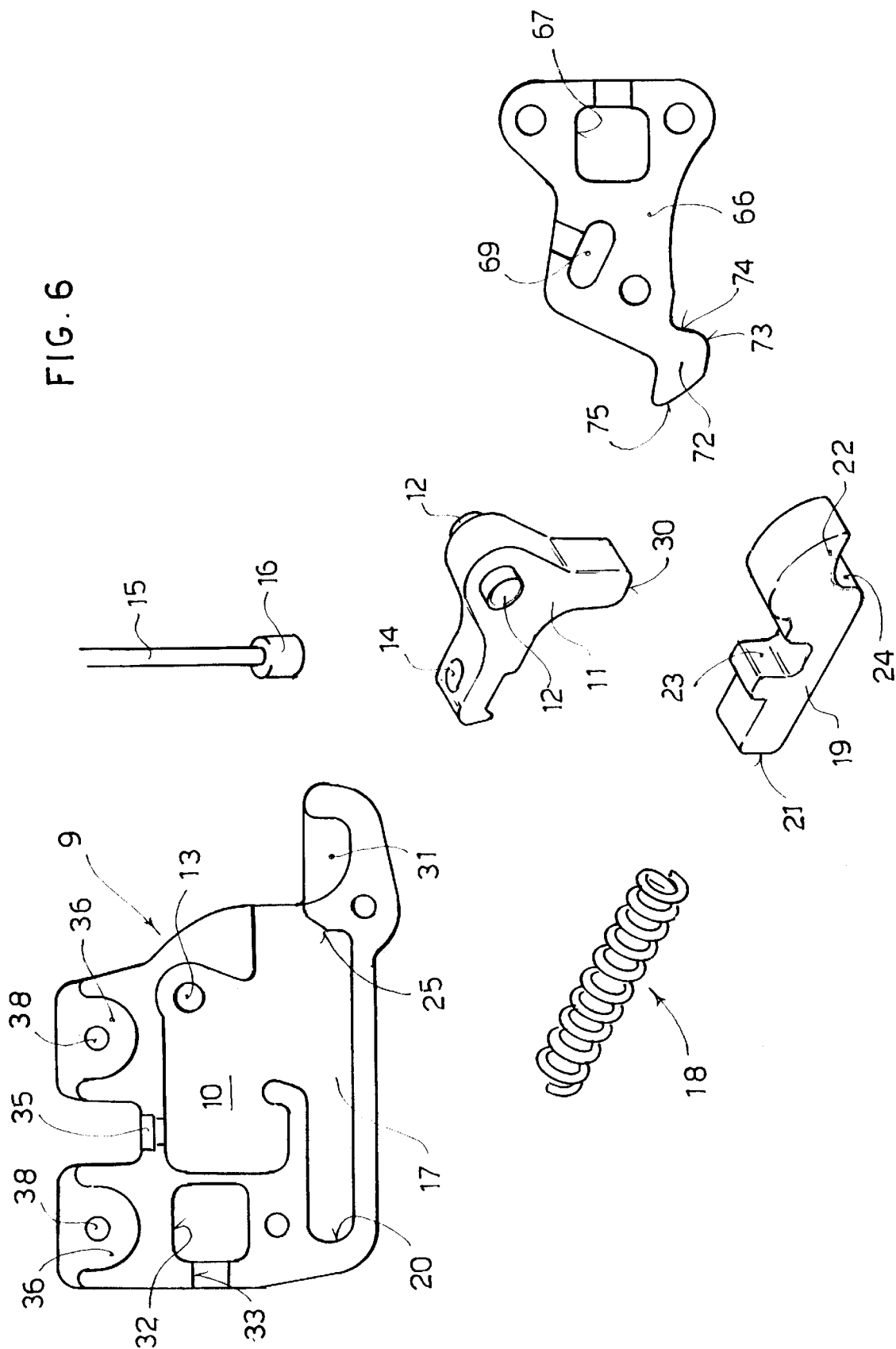
FIG. 6 is an exploded view of the releasing device according to the invention, in which the inner members are shown in perspective and enlarged and the half-shells are shown in a plan view.

As shown also in FIG. 7, the operating device 50 comprises the two chain portions 53 fixed to the closing device 8 and the cable 15 fixed to the lever 11 of the closing device 8 is covered by a sheath 37. In order to maintain the chain portions 53 symmetrically spaced with respect to the cable 15, cross-pieces 55, shown better in FIG. 8, are disposed transversally with respect to the chain portions 53 and to the cable 15 with sheath 37.

The cross piece 55 has a central hole through which the sheath 37 of the cable 15 extends and two side apertures which are fixed to two links of the respective chain portions 53. Between two cross pieces, on the sheath 31, two cylindrical blocks 58 are provided with a greater diameter than that of the hole 56 so as to be able to abut against the cross-pieces 55, avoiding sliding of the sheath 37, whilst the cable 17 is free to slide inside the sheath 37. The cylindrical blocks 58 further act as protective elements and prevent wear on the sheath 37. At its end, the cable 15 has a hook 59 suitable to be gripped by the user in order to be pulled.

The two ends of chain portions 53 end in a chain link 60 which has a hook so as to be fixed to a chain link of the outer ring member 4 (FIG. 1). In this manner the end hook 59 of the cable 15 appears on the outward facing side of the wheel. Thus the user can pull the hook 59 of the cable 15 working from the outward facing side of the wheel.

The other end of the cable 6 of the inner ring 3 which has remained free is fixed to a head 65 able to engage with the closing device 8. The head 65 has two symmetrical half-shells 66 which can be fixed to one another. The half-shell 66 has a first aperture 67 to receive a block 68 fixed to the end of the cable 6 and a second aperture 69 to receive the head 70 of a hook fixed to a link of a transverse chain portion 10.

The half-shell 66 has a tooth 72 with a shape substantially symmetrical to that of the tooth 22 of the pawl member 19. The front surface 75 of the tooth 72 is substantially inclined with the same inclination as that of the tooth 22. The underside 73 of the tooth 72 is substantially rounded like the underside 80 of the seat 31 of the half-shell 9. The rear surface 74 of the tooth 72 is substantially at right angles with respect to the lower surface 73.

Operation of the releasing device according to the invention will now be described. When the inner ring 2 is in the open position the closing device 8 and the head 65 are spaced apart, as in FIGS. 2 and 4. The user, when he wants to close the inner ring 4, pushes the front surface 75 of the tooth 72 of the head 65 on to the front surface of the tooth 22 of the releasing device. Consequently a retraction of the pawl member 19 which compresses the spring 18 is effected and the tooth 72 is accommodated in the seat 31. Thus, when the tooth 72 is accommodated in the seat 31, the pawl member 19, urged by the spring returns to its initial position, in which the abutment surface 24 thereof abuts against the stopping surface 25 of the half-shell 9.

Figure 5:
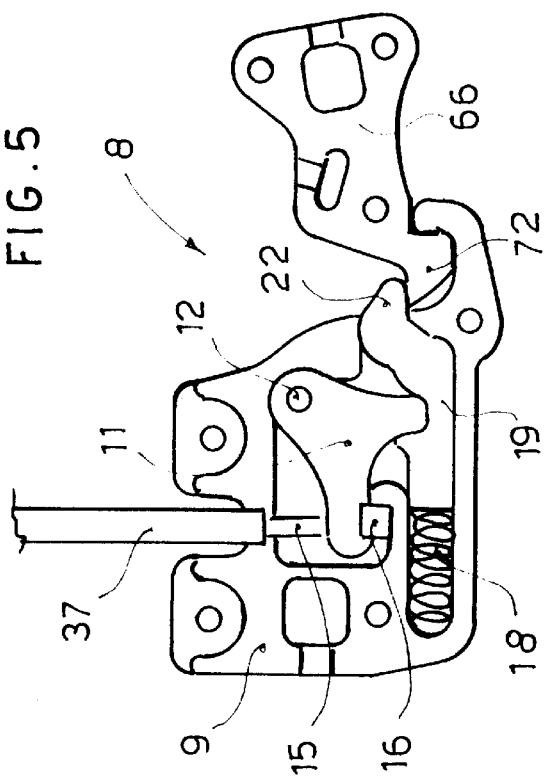
FIG. 5 a part sectional view of the releasing device as shown in FIG. 3.

In this situation, as shown in FIGS. 3 and 5, the tooth 22 of the releasing device is situated above the tooth 72 of the head 65. Consequently traction on the cable 6 of the inner ring 2 cannot bring about disengagement of the head 65 from the closing device 8. In fact, the rear surface 74 of the tooth 72 abuts against the front surface 81 of the seat 31 and the tooth 22 prevents the tooth 72 from jumping out of the seat 31.

In order to open the closing device 8, the user exerts traction on the cable 15, pulling the hook 59. Consequently the block 16 fixed at the end of the thread 15 inside the closing device 8, raises the arm of the lever member 11 which turns around the pivot 12. The end 30 of the lever member then pushes the pawl member 19 rearward, compressing the spring 18. As a consequence of this the tooth 22 retracts inside the half-shell 9 freeing the seat 31 thus the tooth 72 of the head 65 can be extracted from the seat 31.

Furthermore, in the event of jamming of the operating device 50, the particular curved shape of the lower surface 73 of the tooth 72 and of the lower surface 80 of the seat 31 allows extraction of the tooth 72 from the seat 31 by means of rotation of the head 65 even when the tooth 22 is in the extracted position on the seat 31.

Numerous variations and changes of detail within the reach of a person skilled in the art can be made to the present embodiment of the invention, without thereby departing from the scope of the invention expressed by the appended claims.

What is claimed is:

1. A releasing device for snow chains comprising an inner side portion (2) that is closable in a ring shape, suitable to be placed on the inner part of a tire (3), an outer side portion (4) suitable to be placed on the outer side of the tire (3), said portions being joined by chain elements (5) creating tread traction, said releasing device comprising a closing device (8) for closure in a ring shape of the inner side portion (2) and an operating device (50), which can be operated by a user from the outside of the tire, to open said closing device (8), wherein said operating device (50) comprises two chain portions (53) and cross pieces (55) connected to said chain portions (53).

2. A releasing device according to claim 1, wherein said closing device (8) comprises a lever member (11), said operating device (50) comprises a cable (15) acting on said lever member (11) of said closing device (8), two chain portions (53) are disposed alongside and parallel to said cable (15), and said cross pieces (55) are disposed transversally with respect to said cable and fixed to the links of said chain portions (53).

3. A releasing device according to claim 2, wherein the chain portions (53) have first ends and second ends, ends (52) of said two chain portions (53) are fixed to said closing device (8) and said second ends are fixed to a hook (60) hooked to a link of said outer side portion (4).

4. A releasing device according to claim 2, wherein said cable (15) is covered by a sheath (37) that extends through a hole (56) made in a central position in said cross pieces (55).

5. A releasing device according to claim 4, wherein on the sheath (37) of said cable (15) cylindrical blocks (58) are provided which act as stop elements, abutting against said cross pieces (55) to avoid sliding of the sheath (37) and acting as protective and anti-wear elements for the sheath (37).

6. A releasing device according to claim 2, wherein said closing device (8) has a seat 31 and is fixed to one end of the inner side portion (2), the other end of said inner side portion (2) having a head (65) with a second tooth (72), said closing device (8) having a pawl member (19) urged by elastic means (18) so that a first tooth (22) of said pawl member (19) protrudes over said seat (31) to block said second tooth (72) of said head (65) from entering said seat (31).

7. A releasing device according to claim 6, wherein said cable (15) is fixed at one end to a lever member (11), disposed inside said closing device (9) to operate said pawl member (19) so that said first tooth (22) can be retracted from the seat (31) allowing extraction of said second tooth (72) of the head (65).

8. A releasing device according to claim 6, wherein said second tooth (72) and said seat (31) have such a shape as to allow extraction of said second tooth (72) from said seat (31), by means of relative movement therebetween, even when said first tooth (22) protrudes over said seat (31).

9. A releasing device according to claim 8, wherein said second tooth (72) has a lower surface (73), said seat (31) has a lower surface (80), and the lower surface (73) of said second tooth (72) and the lower surface (80) of said seat (31) have substantially complementary arched shapes.

* * * * *